(12) United States Patent
Ge et al.

(10) Patent No.: US 10,378,946 B2
(45) Date of Patent: *Aug. 13, 2019

(54) INK LEVEL SENSING

(71) Applicant: HEWLETT-PACKARD DEVELOPMENT COMPANY, L.P., Houston, TX (US)

(72) Inventors: Ning Ge, Palo Alto, CA (US); Trudy Benjamin, Portland, OR (US); Teck-Khim Neo, Singapore (SG); Joseph M. Torgerson, Philomath, OR (US); Neel Banerjee, Corvallis, OR (US); George H. Corrigan, III, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/423,260

(22) Filed: Feb. 2, 2017

(65) Prior Publication Data
US 2017/0144451 A1      May 25, 2017

Related U.S. Application Data

(63) Continuation of application No. 14/123,522, filed as application No. PCT/US2011/042043 on Jun. 27, 2011, now Pat. No. 9,599,500.

(51) Int. Cl.
*G01F 23/26* (2006.01)
*B41J 2/175* (2006.01)
*B41J 2/14* (2006.01)

(52) U.S. Cl.
CPC ........ *G01F 23/263* (2013.01); *B41J 2/14153* (2013.01); *B41J 2/175* (2013.01); *B41J 2/17566* (2013.01); *B41J 2002/17579* (2013.01)

(58) Field of Classification Search
CPC combination set(s) only.
See application file for complete search history.

(56) References Cited

U.S. PATENT DOCUMENTS 3,623,132 A     11/1971   Green
3,949,245 A *   4/1976    Emmons .............. G11C 19/285
                                                      327/91

(Continued)

FOREIGN PATENT DOCUMENTS

CN    101006647    7/2007
CN    101128722    2/2008

(Continued)

OTHER PUBLICATIONS

European Patent Office. Supplementary European Search Report. Application No. EP 11 86 8432.3 dated Oct. 31, 2016 (4 pages).

*Primary Examiner* — Shelby L Fidler
(74) *Attorney, Agent, or Firm* — HP Inc. Patent Department (57) ABSTRACT

In some examples, a method of sensing an ink level includes applying a pre-charge voltage to a sense capacitor to charge the sense capacitor with a charge, sharing the charge between the sense capacitor and a reference capacitor, causing a reference voltage at a gate of an evaluation transistor, and determining a resistance from a drain to a source of the evaluation transistor that results from the reference voltage.

10 Claims, 7 Drawing Sheets

(56) References Cited

U.S. PATENT DOCUMENTS

| | | | |
|---|---|---|---|
| 4,048,519 A * | 9/1977 | Hoffmann | G11C 11/24 257/238 |
| 4,377,760 A * | 3/1983 | Benoit-Gonin | G01R 29/24 327/50 |
| 4,853,718 A * | 8/1989 | ElHatem | B41J 2/17566 347/7 |
| 5,162,670 A * | 11/1992 | Itakura | G11C 27/024 327/93 |
| 5,343,089 A * | 8/1994 | Itakura | G11C 27/024 327/407 |
| 5,481,212 A * | 1/1996 | Shima | G11C 27/026 327/91 |
| 5,483,109 A * | 1/1996 | Gholston | G01F 23/0084 307/118 |
| 5,517,150 A * | 5/1996 | Okumura | H01L 27/12 257/E27.111 |
| 6,118,989 A * | 9/2000 | Abe | H01Q 11/12 455/127.2 |
| 6,128,039 A * | 10/2000 | Chen | G11C 19/285 250/208.1 |
| 6,141,561 A * | 10/2000 | Izumiyama | H03G 3/3068 330/52 |
| 6,310,635 B1 * | 10/2001 | Coudray | B41J 2/17566 347/7 |
| 6,492,848 B1 * | 12/2002 | Lee | H03K 17/223 327/143 |
| 7,029,082 B2 | 4/2006 | Farr | |
| 7,543,908 B2 | 6/2009 | Jones | |
| 7,567,240 B2 | 7/2009 | Peterson, Jr. et al. | |
| 7,777,501 B2 | 8/2010 | Reynolds et al. | |
| 8,350,740 B2 * | 1/2013 | Akita | G11C 27/024 341/122 |
| 8,536,907 B2 * | 9/2013 | Chen | H03K 17/223 327/142 |
| 8,657,414 B2 * | 2/2014 | Nielsen | B41J 2/14153 347/19 |
| 8,830,095 B2 * | 9/2014 | Darthenay | H03M 1/1245 341/122 |
| 8,912,941 B2 * | 12/2014 | Tokunaga | H03M 3/32 341/118 |
| 9,321,049 B2 * | 4/2016 | Sturmer | G01N 27/22 |
| 9,487,017 B2 * | 11/2016 | Ge | B41J 2/17566 |
| 9,576,679 B2 * | 2/2017 | Powell | G11C 27/026 |
| 9,776,412 B2 * | 10/2017 | Ge | B41J 2/17566 |
| 9,776,419 B2 * | 10/2017 | Ge | B41J 2/04541 |
| 2002/0167343 A1 * | 11/2002 | Erhart | G11C 27/026 327/94 |
| 2006/0192288 A1 | 8/2006 | Ueno | |
| 2007/0153032 A1 | 7/2007 | Chou et al. | |
| 2008/0231651 A1 | 9/2008 | Jung | |
| 2009/0283846 A1 | 11/2009 | Seesink et al. | |
| 2009/0322353 A1 * | 12/2009 | Ungaretti | B06B 1/0292 324/686 |
| 2010/0194408 A1 * | 8/2010 | Sturmer | G01N 27/22 324/664 |
| 2012/0056943 A1 * | 3/2012 | Nielsen | B41J 2/14 347/63 |
| 2012/0071122 A1 * | 3/2012 | Akita | G11C 27/024 455/130 |
| 2014/0077985 A1 * | 3/2014 | Tokunaga | H03M 3/32 341/143 |
| 2014/0204148 A1 * | 7/2014 | Ge | B41J 2/175 347/19 |
| 2014/0333465 A1 * | 11/2014 | Elsayed | H03M 1/0845 341/172 |

FOREIGN PATENT DOCUMENTS

| | | |
|---|---|---|
| CN | 101709988 | 5/2010 |
| CN | 101825663 | 9/2010 |
| EP | 0715153 | 6/1996 |
| JP | H02-169259 | 6/1990 |
| JP | H06-135001 | 5/1994 |
| JP | H11-115201 | 4/1999 |
| JP | 2001121681 | 5/2001 |
| KR | 1020060065276 | 6/2006 |

* cited by examiner

INK LEVEL SENSING

CROSS REFERENCE TO RELATED APPLICATIONS

This is a continuation of U.S. application Ser. No. 14/123,522, filed Dec. 3, 2013, which is a national stage application under 35 U.S.C. § 371 of PCT/US2011/042043, filed Jun. 27, 2011, which are both hereby incorporated by reference in their entirety.

BACKGROUND

Accurate ink level sensing in ink supply reservoirs for all types of inkjet printers is desirable for a number of reasons. For example, sensing the correct level of ink and providing a corresponding indication of the amount of ink left in an ink cartridge allows printer users to prepare to replace finished ink cartridges. Accurate ink level indications also help to avoid wasting ink, since inaccurate ink level indications often result in the premature replacement of ink cartridges that still contain ink. In addition, printing systems can use ink level sensing to trigger certain actions that help prevent low quality prints that might result from inadequate supply levels.

While there are a number of techniques available for determining the level of ink in a reservoir, or fluidic chamber, various challenges remain related to their accuracy and cost.

BRIEF DESCRIPTION OF THE DRAWINGS

The present embodiments will now be described, by way of example, with reference to the accompanying drawings, in which.

DETAILED DESCRIPTION

Overview of Problem and Solution

As noted above, there are a number of techniques available for determining the level of ink in a reservoir such as a fluidic chamber. For example, prisms have been used to reflect or refract light beams in ink cartridges to generate electrical and/or user-viewable ink level indications. Back-pressure indicators are another way to determine ink levels in a reservoir. Some printing systems count the number of ink drops ejected from inkjet print cartridges as a way of determining ink levels. Still other techniques use the electrical conductivity of the ink as an ink level indicator in printing systems. Challenges remain, however, regarding improving the accuracy and cost of ink level sensing systems and techniques.

Embodiments of the present disclosure provide an ink level sensor and related methods that improve on prior ink level sensing techniques. The disclosed sensor and methods employ a capacitive, charge-sharing, sense circuit integrated on-board a thermal inkjet (TIJ) printhead. The sense circuit implements a sample and hold technique that captures the state of the ink level through a capacitive sensor. The capacitance of the capacitive sensor changes with the level of ink. A charge placed on the capacitive sensor is shared between the capacitive sensor and a reference capacitor, causing a reference voltage at the gate of an evaluation transistor. A current source in a printer application specific integrated circuit (ASIC) supplies current at the transistor drain. The ASIC measures the resulting voltage at the current source and calculates the corresponding drain-to-source resistance of the evaluation transistor. The ASIC then determines the status of the ink level based on the resistance determined from the evaluation transistor.

In one embodiment, an ink level sensor includes a sense capacitor whose capacitance changes with the level of ink in a chamber. The sensor includes a switch T2 to apply a voltage Vp to the sense capacitor, which places a charge on the sense capacitor. Another switch T3 shares the charge between the sense capacitor and a reference capacitor, resulting in a reference voltage Vg. An evaluation transistor is configured to provide a drain to source resistance in proportion to the reference voltage.

In another embodiment, an ink level sensor includes a sense capacitor between a node M1 and ground. A switch T2 couples a voltage Vp to M1 to charge the sense capacitor, and a switch T3 couples M1 to M2 to share the charge between the sense capacitor and a reference capacitor, causing a voltage Vg at M2. The sensor includes a transistor T4 having a drain, a gate coupled to M2 and a source coupled to ground. A current source injects a current at the drain, and an executable module calculates a resistance between the drain and the transistor source based on a voltage Vid measured at the drain.

In one embodiment, a method of sensing an ink level includes applying a pre-charge voltage Vp to a sense capacitor to charge the sense capacitor with a charge Q1. The charge Q1 is then shared between the sense capacitor and a reference capacitor, causing a reference voltage Vg at the gate of an evaluation transistor. The method then determines a resistance from the drain to the source of the transistor that results from Vg at the transistor gate.

In another embodiment, a method of sensing an ink level includes placing a charge on a sense capacitor at a memory node M1. The M1 node is then coupled to a second memory node M2 to share the charge between the sense capacitor and a reference capacitor. The shared charge causes a reference voltage Vg at M1, M2, and a transistor gate. A resistance across the transistor drain to source is then determined, and the resistance is compared to a reference value to determine an ink level.

Illustrative Embodiments

Figure 1:
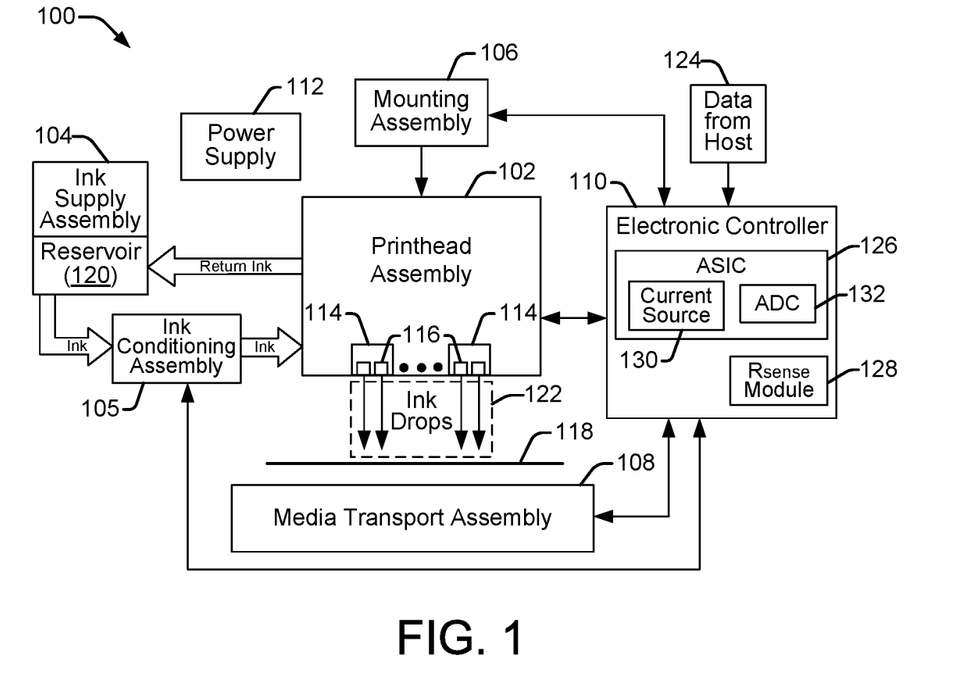
FIG. 1 shows a fluid ejection device embodied as an inkjet printing system suitable for incorporating an ink level sensor, according to an embodiment.

FIG. 1 illustrates a fluid ejection device embodied as an inkjet printing system 100 suitable for incorporating an ink level sensor as disclosed herein, according to an embodiment of the disclosure. In this embodiment, a fluid ejection assembly is disclosed as a fluid drop jetting printhead 114. Inkjet printing system 100 includes an inkjet printhead assembly 102, an ink supply assembly 104, a mounting assembly 106, a media transport assembly 108, an electronic printer controller 110, and at least one power supply 112 that provides power to the various electrical components of inkjet printing system 100. Inkjet printhead assembly 102 includes at least one fluid ejection assembly 114 (printhead 114) that ejects drops of ink through a plurality of orifices or nozzles 116 toward a print medium 118 so as to print onto print media 118. Print media 118 can be any type of suitable sheet or roll material, such as paper, card stock, transparencies, polyester, plywood, foam board, fabric, canvas, and the like. Nozzles 116 are typically arranged in one or more columns or arrays such that properly sequenced ejection of ink from nozzles 116 causes characters, symbols, and/or other graphics or images to be printed on print media 118 as inkjet printhead assembly 102 and print media 118 are moved relative to each other.

Ink supply assembly 104 supplies fluid ink to printhead assembly 102 and includes a reservoir 120 for storing ink. Ink flows from reservoir 120 to inkjet printhead assembly 102. Ink supply assembly 104 and inkjet printhead assembly 102 can form either a one-way ink delivery system or a recirculating ink delivery system. In a one-way ink delivery system, substantially all of the ink supplied to inkjet printhead assembly 102 is consumed during printing. In a recirculating ink delivery system, however, only a portion of the ink supplied to printhead assembly 102 is consumed during printing. Ink not consumed during printing is returned to ink supply assembly 104.

In one embodiment, ink supply assembly 104 supplies ink under positive pressure through an ink conditioning assembly 105 to inkjet printhead assembly 102 via an interface connection, such as a supply tube. Ink supply assembly 104 includes, for example, a reservoir, pumps and pressure regulators. Conditioning in the ink conditioning assembly 105 may include filtering, pre-heating, pressure surge absorption, and degassing. Ink is drawn under negative pressure from the printhead assembly 102 to the ink supply assembly 104. The pressure difference between the inlet and outlet to the printhead assembly 102 is selected to achieve the correct backpressure at the nozzles 116, and is usually a negative pressure between negative 1" and negative 10" of H2O. Reservoir 120 of ink supply assembly 104 may be removed, replaced, and/or refilled.

Mounting assembly 106 positions inkjet printhead assembly 102 relative to media transport assembly 108, and media transport assembly 108 positions print media 118 relative to inkjet printhead assembly 102. Thus, a print zone 122 is defined adjacent to nozzles 116 in an area between inkjet printhead assembly 102 and print media 118. In one embodiment, inkjet printhead assembly 102 is a scanning type printhead assembly. As such, mounting assembly 106 includes a carriage for moving inkjet printhead assembly 102 relative to media transport assembly 108 to scan print media 118. In another embodiment, inkjet printhead assembly 102 is a non-scanning type printhead assembly. As such, mounting assembly 106 fixes inkjet printhead assembly 102 at a prescribed position relative to media transport assembly 108. Thus, media transport assembly 108 positions print media 118 relative to inkjet printhead assembly 102.

Electronic printer controller 110 typically includes a processor, firmware, software, one or more memory components including volatile and no-volatile memory components, and other printer electronics for communicating with and controlling inkjet printhead assembly 102, mounting assembly 106, and media transport assembly 108. Electronic controller 110 receives data 124 from a host system, such as a computer, and temporarily stores data 124 in a memory. Typically, data 124 is sent to inkjet printing system 100 along an electronic, infrared, optical, or other information transfer path. Data 124 represents, for example, a document and/or file to be printed. As such, data 124 forms a print job for inkjet printing system 100 and includes one or more print job commands and/or command parameters.

In one embodiment, electronic printer controller 110 controls inkjet printhead assembly 102 for ejection of ink drops from nozzles 116. Thus, electronic controller 110 defines a pattern of ejected ink drops that form characters, symbols, and/or other graphics or images on print media 118. The pattern of ejected ink drops is determined by the print job commands and/or command parameters from data 124. In one embodiment, electronic controller 110 includes a printer application specific integrated circuit (ASIC) 126 and a resistance-sense firmware module 128 executable on ASIC 126 or controller 110. Printer ASIC 126 includes a current source 130 and an analog to digital converter (ADC) 132. ASIC 126 can convert the voltage present at current source 130 to determine a resistance, and then determine a corresponding digital resistance value through the ADC 132. A programmable algorithm implemented by the resistance-sense module 128 enables the resistance determination and the subsequent digital conversion through the ADC 132.

In the described embodiments, inkjet printing system 100 is a drop-on-demand thermal inkjet printing system with a thermal inkjet (TIJ) printhead 114 suitable for implementing an ink level sensor as disclosed herein. In one implementation, inkjet printhead assembly 102 includes a single TIJ printhead 114. In another implementation, inkjet printhead assembly 102 includes a wide array of TIJ printheads 114. While the fabrication processes associated with TIJ printheads are well suited to the integration of the ink level sensor, other printhead types such as a piezoelectric printhead can also implement such an ink level sensor. Thus, the disclosed ink level sensor is not limited to implementation in a TIJ printhead 114.

Figure 2:
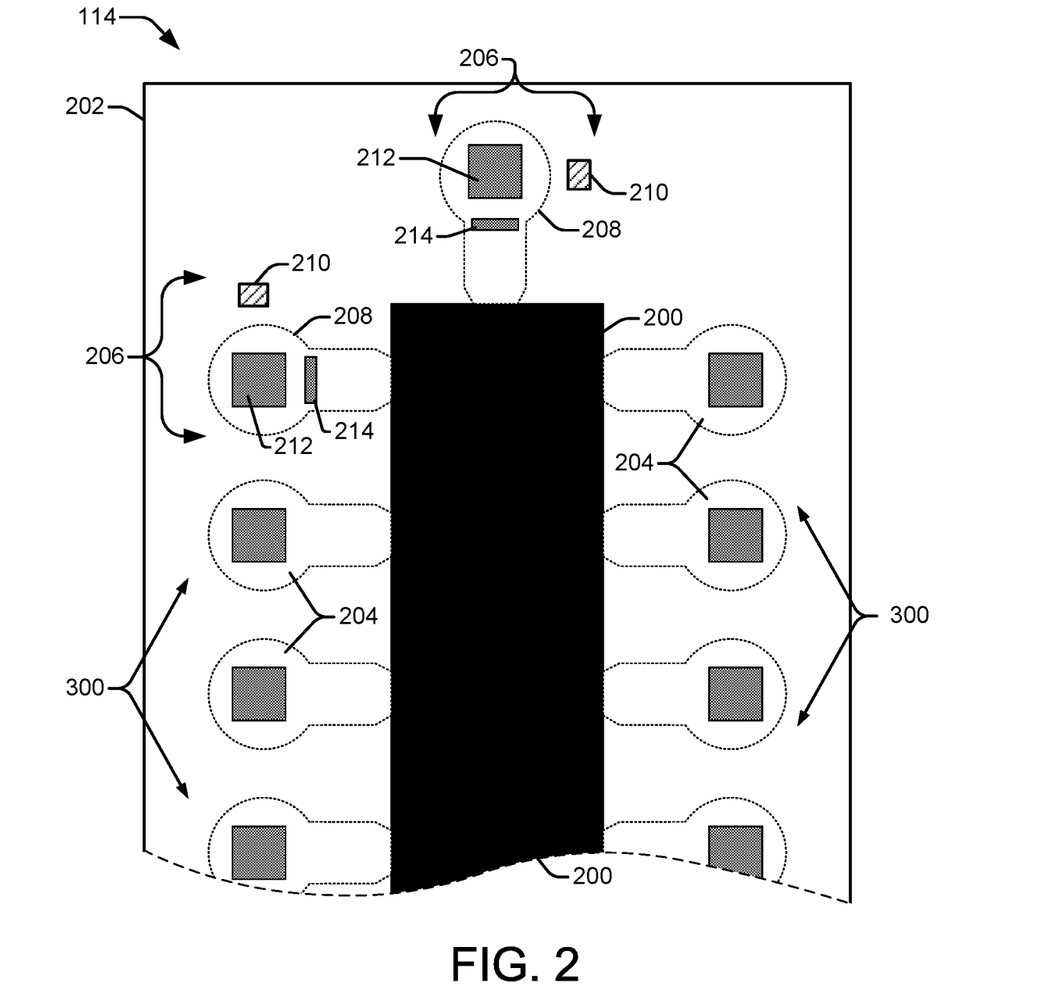
FIG. 2 shows a bottom view of one end of a TIJ printhead having a single fluid slot formed in a silicon die substrate, according to an embodiment.

FIG. 2 shows a bottom view of one end of a TIJ printhead 114 having a single fluid slot 200 formed in a silicon die substrate 202, according to an embodiment of the disclosure. Although printhead 114 is shown with a single fluid slot 200, the principles discussed herein are not limited in their application to a printhead with just one slot 200. Rather, other printhead configurations are also possible, such as printheads with two or more ink slots. In the TIJ printhead 114, substrate 202 underlies a chamber layer having fluid chambers 204 and a nozzle layer having nozzles 116 formed therein, as discussed below with respect to FIG. 3. However, for the purpose of illustration, the chamber layer and nozzle layer in FIG. 2 are assumed to be transparent in order to show the underlying substrate 202. Therefore, chambers 204 in FIG. 2 are illustrated using dashed lines. The fluid slot 200 is an elongated slot formed in the substrate 202 that has fluid drop generators 300 (FIG. 3) arranged along both sides of the slot. The fluid slot 200 is in fluid communication with a fluid supply (not shown), such as a fluid reservoir 120.

Figure 3:
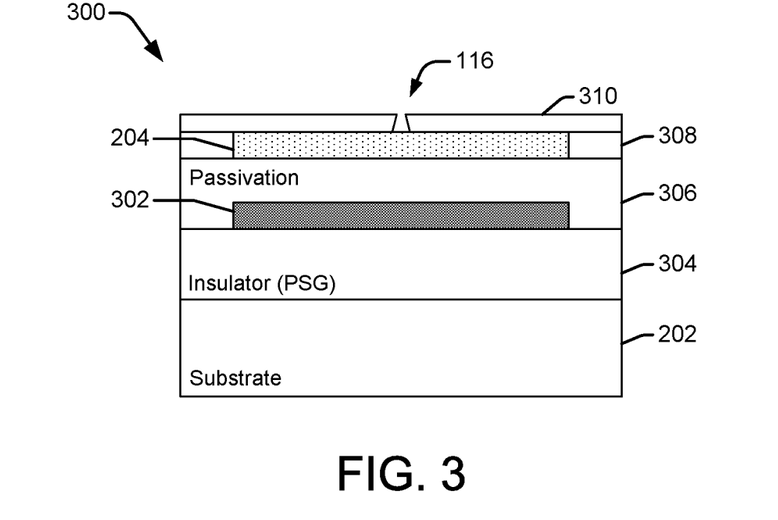
FIG. 3 shows a cross-sectional view of an example fluid drop generator, according to an embodiment.

FIG. 3 shows a cross-sectional view of an example fluid drop generator 300, according to an embodiment of the disclosure. Each drop generator 300 includes a nozzle 116, a fluid chamber 204, and a firing element 302 disposed in the fluid chamber 204. Nozzles 116 are formed in nozzle layer 310 and are generally arranged to form nozzle columns along the sides of the fluid slot 200. Firing element 302 is a thermal resistor formed of a metal plate (e.g., tantalum-aluminum, TaAl) on an insulating layer 304 (e.g., polysilicon glass, PSG) on a top surface of the silicon substrate 202. A passivation layer 306 over the firing element 302 protects the firing element from ink in chamber 204 and acts as a mechanical passivation or protective cavitation barrier structure to absorb the shock of collapsing vapor bubbles. A chamber layer 308 has walls and chambers 204 that separate the substrate 202 from the nozzle layer 310.

During operation, a fluid drop is ejected from a chamber 204 through a corresponding nozzle 116 and the chamber 204 is then refilled with fluid circulating from fluid slot 200. More specifically, an electric current is passed through a resistor firing element 302 resulting in rapid heating of the element. A thin layer of fluid adjacent to the passivation layer 306 over the firing element 302 is superheated and vaporizes, creating a vapor bubble in the corresponding firing chamber 204. The rapidly expanding vapor bubble forces a fluid drop out of the corresponding nozzle 116. When the heating element cools, the vapor bubble quickly collapses, drawing more fluid from fluid slot 200 into the firing chamber 204 in preparation for ejecting another drop from the nozzle 116.

Referring again to FIG. 2, in addition to drop generators 300, the TIJ printhead 114 includes one or more printhead-integrated ink level sensors 206. An ink level sensor 206 generally includes a sense structure 208 and an ink level sensor circuit 210 integrated on the printhead 114. However, an ink level sensor 206 additionally incorporates a current source 130 and analog to digital convertor (ADC) 132 from a printer ASIC 126 that is not integrated on the printhead 114. Instead, the printer ASIC 126 is located, for example, on the printer carriage or electronic controller of the printer system 100. The ink level sensor circuit 210 incorporates a sense capacitor (Csense) 212 from within the sense structure 208. A sense structure 208 and an ink level sensor circuit 210 can be located on the printhead substrate along the ink slot 200 in any position where a typical drop generator 300 is located. The sense structure 208 and ink level sensor circuit 210 are discussed in greater detail below with respect to FIGS. 4 and 5.

Figure 4:
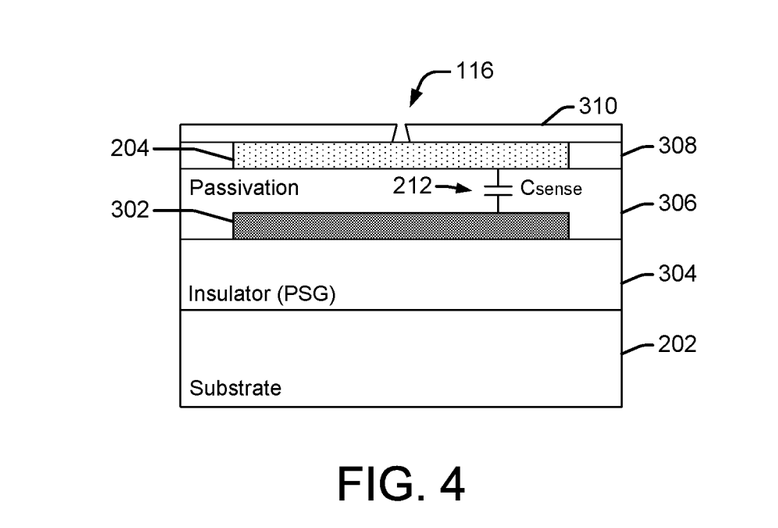
FIG. 4 shows a cross-sectional view of an example sense structure, according to an embodiment.

FIG. 4 shows a cross-sectional view of an example sense structure 208, according to an embodiment of the disclosure. The sense structure 208 is generally configured in the same manner as a typical drop generator 300, but it may include additional features such as a clearing resistor 214 (shown in FIG. 2) used to purge ink residue from the chamber of the sense structure 208. Therefore, like a typical drop generator 300, the sense structure 208 includes a nozzle 116, a fluid chamber 204, a conductive element such as a metal plate firing element 302 disposed in the fluid chamber 204, a passivation layer 306 over the firing element 302, and an insulating layer 304 (e.g., polysilicon glass, PSG) on a top surface of the silicon substrate 202.

Within the sense structure 212, a sense capacitor (Csense) 212 is formed by the metal plate element 302, the passivation layer 306, and the substance or contents of the chamber 204. The value of the sense capacitor 212 changes as the substance within the chamber 204 changes. The substance in the chamber 204 can be all ink, ink and air, or just air. Thus, the value of the sense capacitor 212 changes with the level of ink in the chamber 204. When ink is present in the chamber 204, the sense capacitor 212 has good conductance to ground so the capacitance value is highest (i.e., 100%). However, when there is no ink in the chamber 204 (i.e., air only) the capacitance of sense capacitor 212 drops to a very small value, which is ideally close to zero. When the chamber contains ink and air, the capacitance value of sense capacitor 212 is somewhere between zero and 100%. Using the changing value of the sense capacitor 212, the ink level sensor circuit 210 is able to determine the ink level. In general, the ink level in the chamber 204 is indicative of the level of ink in reservoir 120 of printer system 100. In some embodiments, prior to measuring the ink level with sensor circuit 210, a clearing resistor 214 (shown in FIG. 2) is used to purge ink residue from the chamber of the sense structure 208. Thereafter, to the extent that ink is present in the reservoir 120, it flows back into the chamber to enable an accurate ink level measurement.

Figure 5:
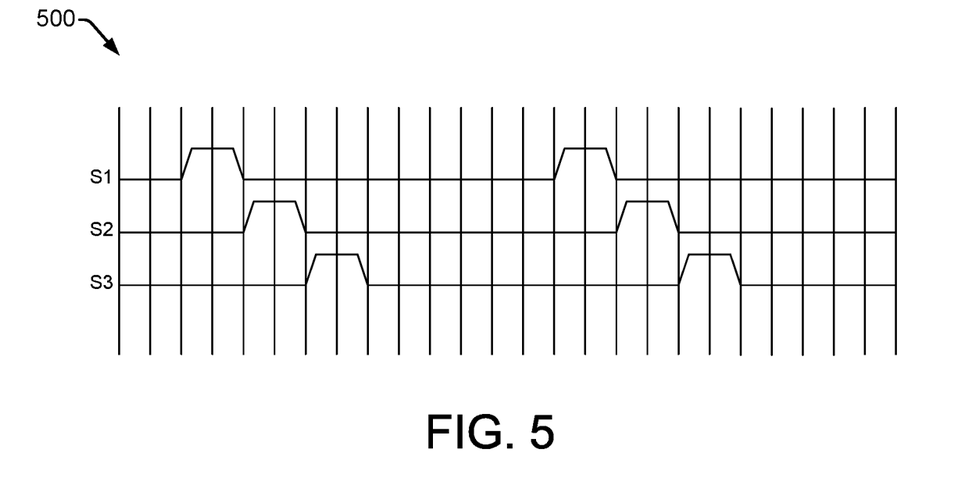
FIG. 5 shows a timing diagram of non-overlapping clock signals used to drive a printhead, according to an embodiment.

FIG. 5 shows an example of a partial timing diagram 500 having non-overlapping clock signals (S1-S3) with synchronized data and fire signals that may be used to drive a printhead 114, according to an embodiment of the disclosure. The clock signals in timing diagram 500 are also used to drive the operation of the ink level sensor circuit 210 as discussed below with regard to FIG. 6.

Figure 6:
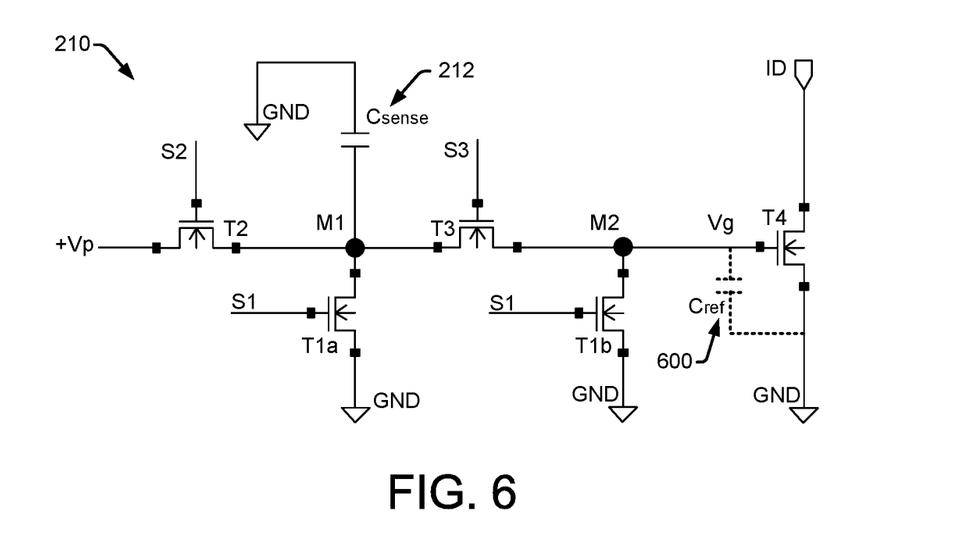
FIG. 6 shows an example ink level sensor circuit, according to an embodiment.

FIG. 6 shows an example ink level sensor circuit 210, according to an embodiment of the disclosure. In general, sensor circuit 210 employs a charge sharing mechanism to determine different levels of ink in a chamber. Sensor circuit 210 includes two first transistors, T1 (T1a, T1b), configured as switches. Referring to FIGS. 5 and 6, during operation of the sensor circuit 210, in a first step a clock pulse S1 is used to close the transistor switches T1a and T1b, coupling memory nodes M1 and M2 to ground and discharging the sense capacitor 212 and the reference capacitor 600. Reference capacitor 600 is the capacitance between node M2 and ground. In this embodiment, reference capacitor 600 is implemented as the inherent gate capacitance of evaluation transistor T4, and it is therefore illustrated using dashed lines. Reference capacitor 600 additionally includes associated parasitic capacitance such as gate-source overlap capacitance, but the T4 gate capacitance is the dominant capacitance in reference capacitor 600. Using the gate capacitance of transistor T4 as a reference capacitor 600 reduces the number of components in sensor circuit 210 by avoiding a specific reference capacitor fabricated between node M2 and ground. However, in other embodiments, it may be beneficial to adjust the value of reference capacitor 600 through the inclusion of a specific capacitor fabricated from M2 to ground (i.e., in addition to the inherent gate capacitance of T4).

In a second step, the S1 clock pulse terminates, opening the T1a and T1b switches. Directly after the T1 switches open, an S2 clock pulse is used to close transistor switch T2. Closing T2 couples node M1 to a pre-charge voltage, Vp (e.g., on the order of +15 volts), and a charge Q1 is placed across sense capacitor 212 according to the equation, Q1= (Csense)(Vp). At this time the M2 node remains at zero voltage potential since the S3 clock pulse is off. In a third step, the S2 clock pulse terminates, opening the T2 transistor switch. Directly after the T2 switch opens, the S3 clock pulse closes transistor switch T3, coupling nodes M1 and M2 to one another and sharing the charge Q1 between sense capacitor 212 and reference capacitor 600. The shared charge Q1 between sense capacitor 212 and reference capacitor 600 results in a reference voltage, Vg, at node M2 which is also at the gate of evaluation transistor T4, according to the following equation:

$$Vg = \left(\frac{Csense}{Csense + Cref}\right) Vp$$

Vg remains at M2 until another cycle begins with a clock pulse S1 grounding memory nodes M1 and M2. Vg at M2 turns on evaluation transistor T4, which enables a measurement at ID (the drain of transistor T4). In this embodiment it is presumed that transistor T4 is biased in the linear mode of operation, where T4 acts as a resistor whose value is proportional to the gate voltage Vg (i.e., reference voltage). The T4 resistance from drain to source (coupled to ground) is determined by forcing a small current at ID (i.e., a current on the order of 1 milliamp). ID is coupled to a current source, such as current source 130 in printer ASIC 126. Upon applying the current source at ID, the voltage is measured at ID ($V_{ID}$). Firmware, such as Rsense module 128 executing on controller 110 or ASIC 126 can convert $V_{ID}$ to a resistance Rds from drain to source of the T4 transistor using the current and $V_{ID}$. The ADC 132 in printer ASIC 126 subsequently determines a corresponding digital value for the resistance Rds. The resistance Rds enables an inference as to the value of Vg based on the characteristics of transistor T4. Based on a value for Vg, a value of Csense can be found from the equation for Vg shown above. A level of ink can then be determined based on the value of Csense.

Once the resistance Rds is determined, there are various ways in which the level ink can be found. For example, the measured Rds value can be compared to a reference value for Rds, or a table of Rds values experimentally determined to be associated with specific ink levels. With no ink (i.e., a "dry" signal), or a very low ink level, the value of sense capacitor 212 is very low. This results in a very low Vg (on the order of 1.7 volts), and the evaluation transistor T4 is off or nearly off (i.e., T4 is in cut off or sub-threshold operation region). Therefore, the resistance Rds from ID to ground through T4 would be very high (e.g., with ID current of 1.2 mA, Rds is typically above 12 k ohm). Conversely, with a high ink level (i.e., a "wet" signal), the value of sense capacitor 212 is close to 100% of its value, resulting in a high value for Vg (on the order of 3.5 volts). Therefore, the resistance Rds is low. For example, with a high ink level Rds is below 1 k ohm, and is typically a few hundred ohms.

Figure 7:
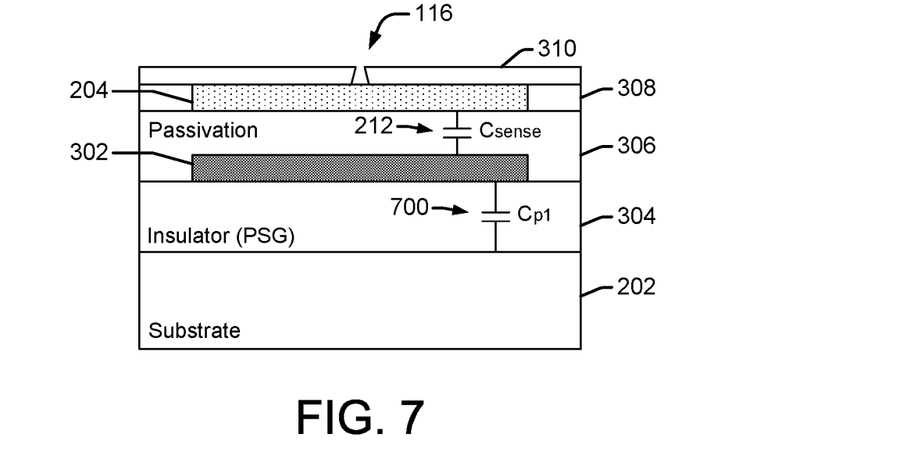
FIG. 7 shows a cross-sectional view of an example sense structure with both a sense capacitor and an intrinsic parasitic capacitance, according to an embodiment.

FIG. 7 shows a cross-sectional view of an example sense structure 208 that illustrates both the sense capacitor 212 and an intrinsic parasitic capacitance Cp1 (700) underneath the metal plate 302 that forms part of sense capacitor 212, according to an embodiment of the disclosure. The intrinsic parasitic capacitance Cp1 700 is formed by the metal plate 302, the insulation layer 304, and substrate 202. As described above, an ink level sensor 206 determines an ink level based on the capacitance value of sense capacitor 212. However, when a voltage (i.e., Vp) is applied to the metal plate 302, charging the sense capacitor 212, the Cp1 700 capacitor also charges. Because of this, the parasitic capacitance Cp1 700 can contribute on the order of 20% of the capacitance determined for sense capacitor 212. This percentage will vary depending on the thickness of the insulation layer 304 and the dielectric constant of the insulation material. However, the charge remaining in the parasitic capacitance Cp1 700 in a "dry" state (i.e., where no ink is present) is enough to turn on the evaluation transistor T4. The parasitic Cp1 700 therefore dilutes the dry/wet signal.

Figure 8:
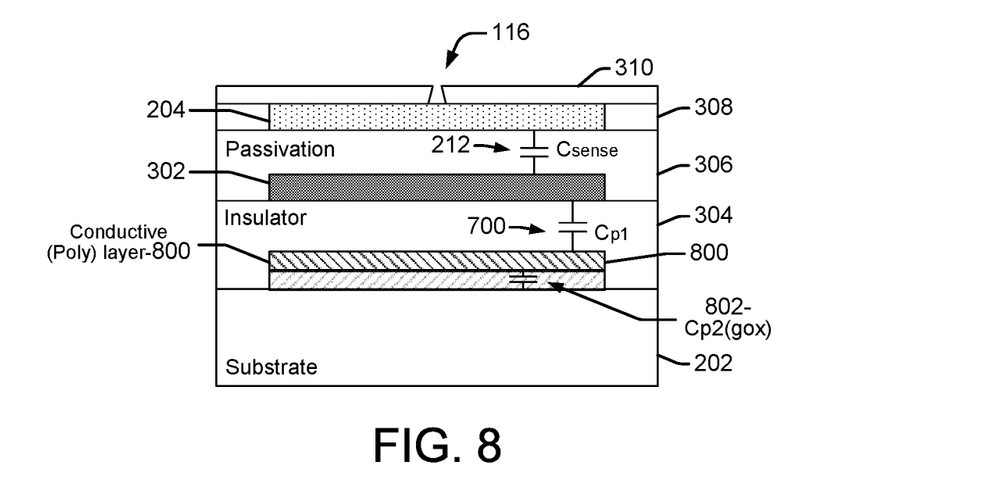
FIG. 8 shows a cross-sectional view of an example sense structure that includes a parasitic elimination element, according to an embodiment.

FIG. 8 shows a cross-sectional view of an example sense structure 208 that includes a parasitic elimination element 800, according to an embodiment of the disclosure. The parasitic elimination element is a conductive layer 800 such as a poly silicon layer designed to eliminate the impact of the parasitic capacitance Cp1 700. In this design, when a voltage (i.e., Vp) is applied to the metal plate 302, it is also applied to the conductive layer 800. This prevents a charge from developing on the Cp1 700 so that Cp1 is effectively removed/isolated from the determination of the sense capacitor 212 capacitance. Cp2, element 802, is the intrinsic capacitance from the parasitic elimination element 800 (conductive poly layer 800). Cp2 802 slows the charging speed of the parasitic elimination element 800 but has no impact on the removal/isolation of Cp1 700 because there is sufficient charge time provided for element 800.

Figure 9:
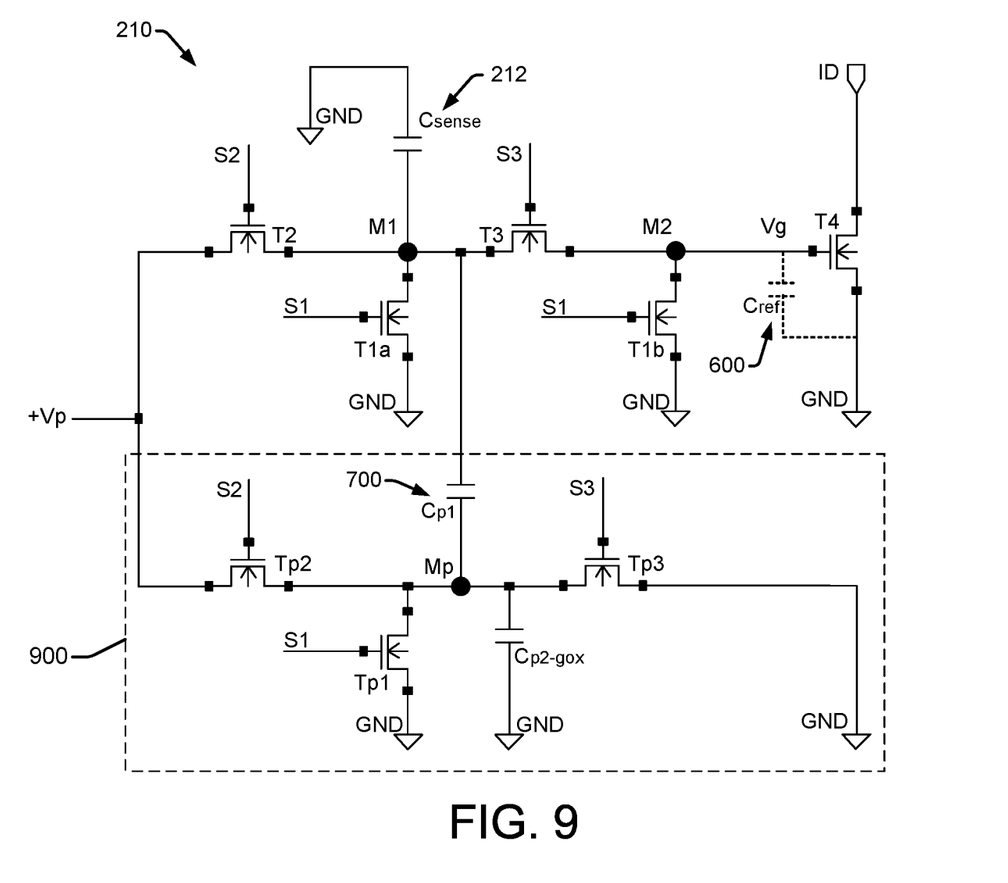
FIG. 9 shows an example ink level sensor circuit with a parasitic elimination circuit, according to an embodiment.

FIG. 9 shows an example ink level sensor circuit 210 with a parasitic elimination circuit 900, according to an embodiment of the disclosure. In FIG. 9, the parasitic capacitance Cp1 700 is shown coupled between the metal plate 302 (node M1) and the conductive layer 800 (node Mp). Referring to FIGS. 8 and 9, the ink level sensor circuit 210 with parasitic elimination circuit 900 are driven by non-overlapping clock signals such as those shown in the timing diagram 500 of FIG. 5. In a first step, a clock pulse S1 is used to close the transistor switches T1a, T1b and Tp1. Closing switches T1a, T1b and Tp1 couples memory nodes M1, M2 and Mp to ground, discharging the sense capacitor (Csense) 212, the reference capacitor (Cref) 600 and the parasitic capacitor (Cp1) 700. In a second step, the S1 clock pulse terminates, opening the T1a, T1b and Tp1 switches. Directly after the T1a, T1b and Tp1 switches open, an S2 clock pulse is used to close transistor switches T2 and Tp2. Closing T2 and Tp2 couples nodes M1 and Mp, respectively, to a pre-charge voltage, Vp. This places a charge Q1 across sense capacitor (Csense) 212. However, with nodes M1 and Mp at the same voltage potential, Vp, no charge develops across parasitic capacitor (Cp1) 700.

The ink level sensor circuit 210 then continues to function as described above with regard to FIG. 6. Thus, in a third step, the S2 clock pulse terminates, opening the T2 and Tp2 transistor switches. Directly after the T2 and Tp2 switches open, the S3 clock pulse closes transistor switches T3 and Tp3. Closing switch T3 couples nodes M1 and M2 to one another and shares the charge Q1 between sense capacitor 212 and reference capacitor 600. The shared charge Q1 between sense capacitor 212 and reference capacitor 600 results in a reference voltage, Vg, at node M2 which is also at the gate of evaluation transistor T4. Closing switch Tp3 couples parasitic capacitor (Cp1) 700 to ground. During the S3 clock pulse, parasitic charge on Cp1 700 is discharged, leaving only the sense capacitor 212 to be evaluated with the evaluation transistor T4. Since the effect of the parasitic capacitor (Cp1) 700 is removed, for a dry signal there is a much reduced parasitic contribution to turn on T4.

Figure 10:
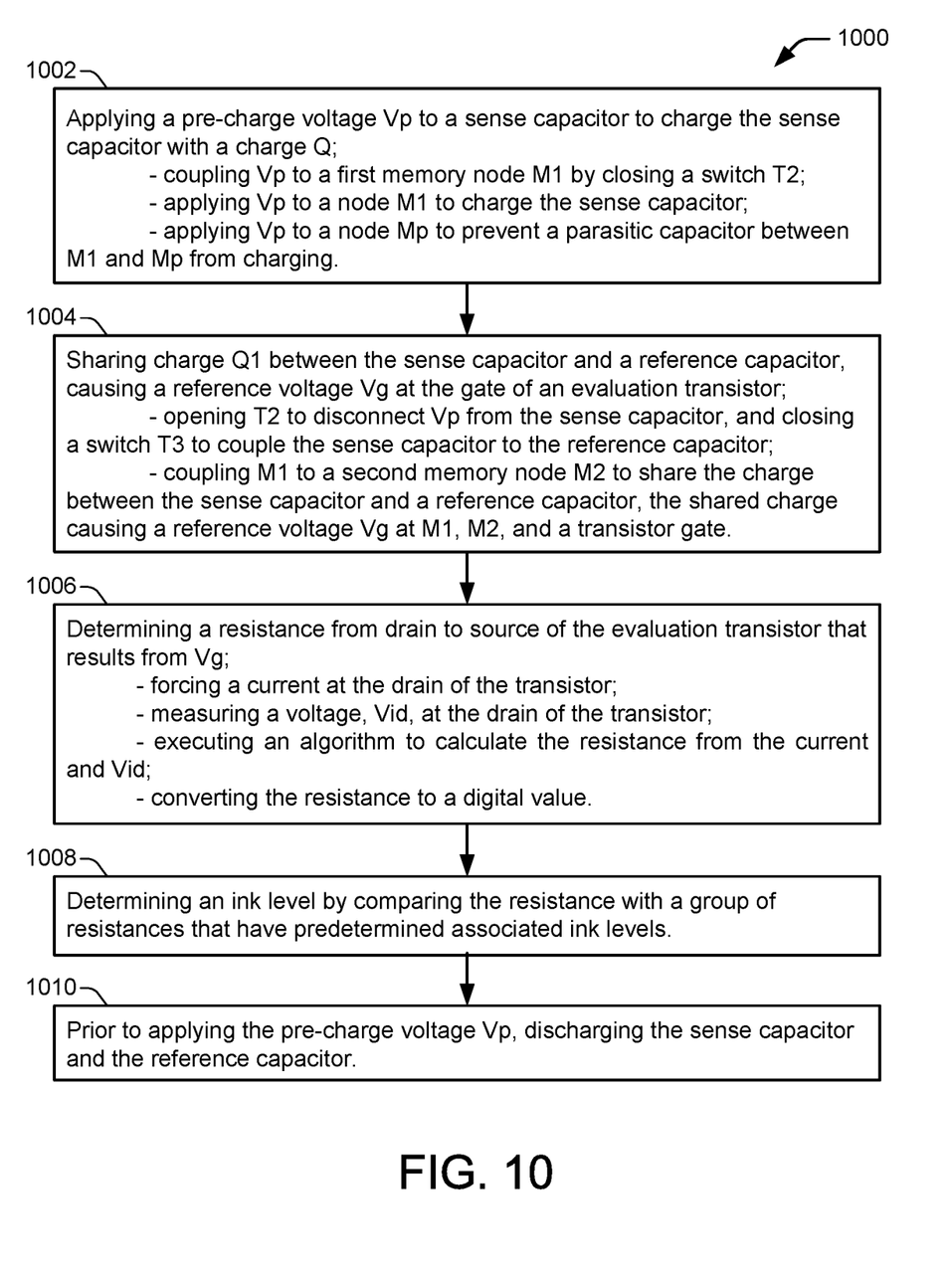
FIG. 10 shows a flowchart of an example method of sensing an ink level, according to an embodiment.

FIG. 10 shows a flowchart of an example method 1000 of sensing an ink level, according to an embodiment of the disclosure. Method 1000 is associated with the embodiments discussed above with respect to FIGS. 1-9. Method 1000 begins at block 1002, with applying a pre-charge voltage Vp to a sense capacitor to charge the sense capacitor with a charge Q. Applying Vp to the sense capacitor includes coupling Vp to a first memory node M1 by closing a switch T2. In another embodiment, applying Vp additionally includes applying Vp to a node Mp to prevent a parasitic capacitor between M1 and Mp from charging.

At step 1004 of method 1000, a charge Q1 is shared between the sense capacitor and a reference capacitor, causing a reference voltage Vg at the gate of an evaluation transistor. Sharing the charge Q1 includes opening T2 to disconnect Vp from the sense capacitor, and closing a switch T3 to couple the sense capacitor to the reference capacitor. The sharing couples M1 to a second memory node M2 to share the charge between the sense capacitor and a reference capacitor, and the shared charge causes the reference voltage Vg at M1, M2, and the transistor gate.

The method 1000 continues at step 1006 with determining a resistance from drain to source of the evaluation transistor that results from Vg. The resistance is determined by forcing a current at the drain of the transistor, measuring a voltage, Vid, at the drain of the transistor, executing an algorithm to calculate the resistance from the current and Vid, and converting the resistance to a digital value.

At step 1008 of method 1000, an ink level is determined by comparing the resistance with a group of resistances that have predetermined associated ink levels. At step 1010 of method 1000, prior to applying the pre-charge voltage Vp, the sense capacitor and the reference capacitor are discharged.

What is claimed is:

1. An apparatus comprising:
   a sense capacitor between a first node and ground;
   a first switch to couple a first voltage to the first node and charge the sense capacitor;
   a second switch to couple the first node with a second node and share the charge between the sense capacitor and a reference capacitor, causing a second voltage at the second node;
   a transistor having a drain, a gate coupled to the second node, and a source coupled to ground;
   a current source to inject a current at the drain; and
   a controller to calculate a resistance between the drain and the source of the transistor based on a voltage at the drain.

2. The apparatus of claim 1, further comprising:
   an analog to digital converter (ADC) to convert the resistance to a digital value.

3. The apparatus of claim 1, wherein the sense capacitor, the first node, the second node, the first switch, the second switch, and the transistor are integrated on a printhead, and the controller is a printer controller.

4. The apparatus of claim 1, further comprising a third switch to couple the first and second nodes to ground to discharge the sense capacitor and the reference capacitor prior to coupling the first voltage to the first node.

5. The apparatus of claim 1, further comprising a third node coupled to the first voltage through the first switch to prevent a parasitic capacitance between the first and third nodes from charging.

6. The apparatus of claim 1, wherein the sense capacitor comprises:
   a metal layer;
   a passivation layer over the metal layer; and
   a substance within a chamber above the passivation layer.

7. The apparatus of claim 6, wherein the substance comprises a fluid in the chamber.

8. The apparatus of claim 6, wherein the metal layer is part of a resistor firing element.

9. The apparatus of claim 1, wherein the controller is to calculate the resistance by:
   measuring the voltage at the drain of the transistor; and
   calculating the resistance from the current and the voltage at the drain of the transistor.

10. The apparatus of claim 9, wherein the controller is to determine an ink level by comparing the resistance with a group of resistances that have predetermined associated ink levels.

* * * * *